(12) United States Patent
Araki et al.

(10) Patent No.: US 11,009,481 B2
(45) Date of Patent: May 18, 2021

(54) GAS SENSOR

(71) Applicant: DENSO CORPORATION, Kariya (JP)

(72) Inventors: Takashi Araki, Kariya (JP); Mitsunobu Nakato, Kariya (JP)

(73) Assignee: DENSO CORPORATION, Kariya (JP)

( * ) Notice: Subject to any disclaimer, the term of this patent is extended or adjusted under 35 U.S.C. 154(b) by 144 days.

(21) Appl. No.: 16/094,223

(22) PCT Filed: Apr. 7, 2017

(86) PCT No.: PCT/JP2017/014584
§ 371 (c)(1),
(2) Date: Oct. 17, 2018

(87) PCT Pub. No.: WO2017/183491
PCT Pub. Date: Oct. 26, 2017

(65) Prior Publication Data
US 2019/0094172 A1     Mar. 28, 2019

(30) Foreign Application Priority Data

Apr. 18, 2016   (JP) .............................. JP2016-082922

(51) Int. Cl.
*G01N 27/409* (2006.01)
*G01N 27/406* (2006.01)
(Continued)

(52) U.S. Cl.
CPC ....... *G01N 27/409* (2013.01); *G01N 27/4067* (2013.01); *G01N 27/41* (2013.01); *G01N 27/416* (2013.01)

(58) Field of Classification Search
CPC ............................ G01N 27/409; G01N 27/41
See application file for complete search history.

(56) References Cited

U.S. PATENT DOCUMENTS

2006/0102476 A1 *  5/2006  Niwa ................. G01N 27/4067
                                                            204/425
2008/0028831 A1    2/2008  Nakashima et al.
(Continued)

FOREIGN PATENT DOCUMENTS

| EP | 2 840 388 | 2/2015 |
| JP | 2010-66075 | 3/2010 |

(Continued)

OTHER PUBLICATIONS

JP 2010/066075 a machine translation. (Year: 2010).*
JP 2010/066075, machine translation. (Year: 2010).*

*Primary Examiner* — Luan V Van
*Assistant Examiner* — Caitlyn Mingyun Sun
(74) *Attorney, Agent, or Firm* — Nixon & Vanderhye P.C.

(57) ABSTRACT

Provided is a gas sensor achieving improvement in detection accuracy for a specific gas component and responsiveness for detecting the specific gas component. A guide body is provided at a base end section of a first inner circulation hole in an inner cover of the gas sensor. The base end section is located between a base end position P1 2 mm away from a tip end of a sensor element in an axial direction L towards a base end side L1 and a tip end position P2 2 mm away from the tip end towards a tip end side L2. The tip end is on the base end side L1 relative to an imaginary line K passing through a base end and a tip end on a surface on the tip end side of the guide body.

14 Claims, 10 Drawing Sheets

(51) Int. Cl.
*G01N 27/41* (2006.01)
*G01N 27/416* (2006.01)

(56) References Cited

U.S. PATENT DOCUMENTS

| | | | |
|---|---|---|---|
| 2009/0020425 | A1 | 1/2009 | Yamada |
| 2013/0126352 | A1 | 5/2013 | Sekiya et al. |
| 2015/0083588 | A1 * | 3/2015 | Murata .............. G01N 27/4163 204/401 |
| 2015/0300979 | A1 | 10/2015 | Endo et al. |
| 2017/0219516 | A1 | 8/2017 | Toudou et al. |

FOREIGN PATENT DOCUMENTS

| | | |
|---|---|---|
| JP | 2012-18188 | 1/2012 |
| JP | 2013-231687 | 11/2013 |

\* cited by examiner

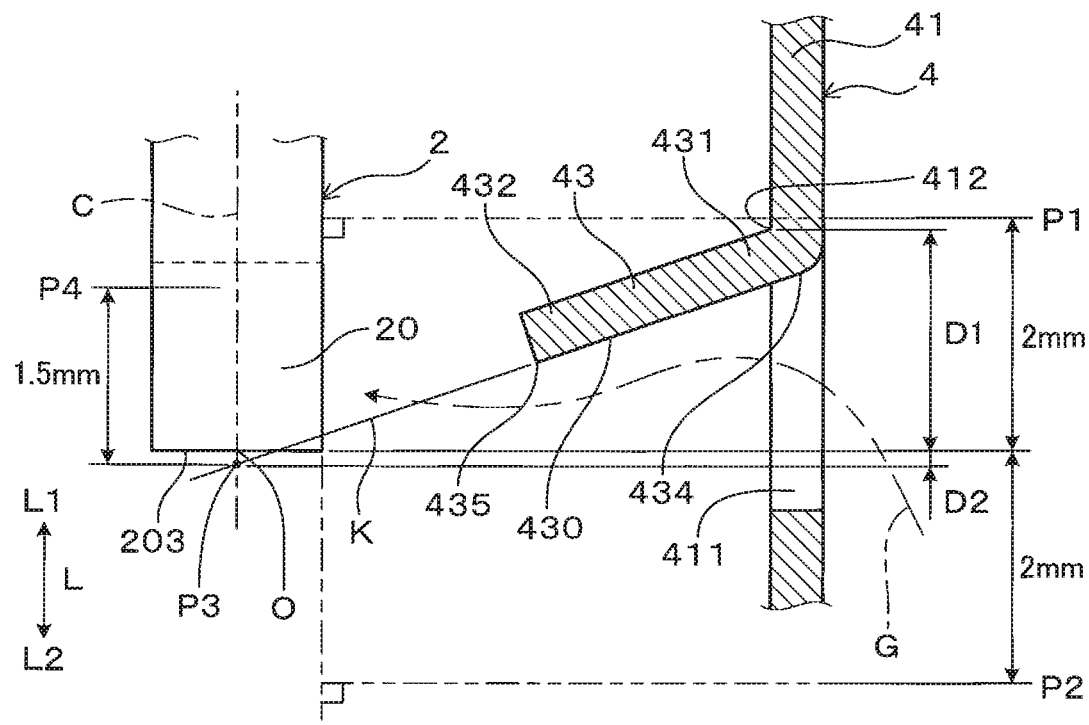
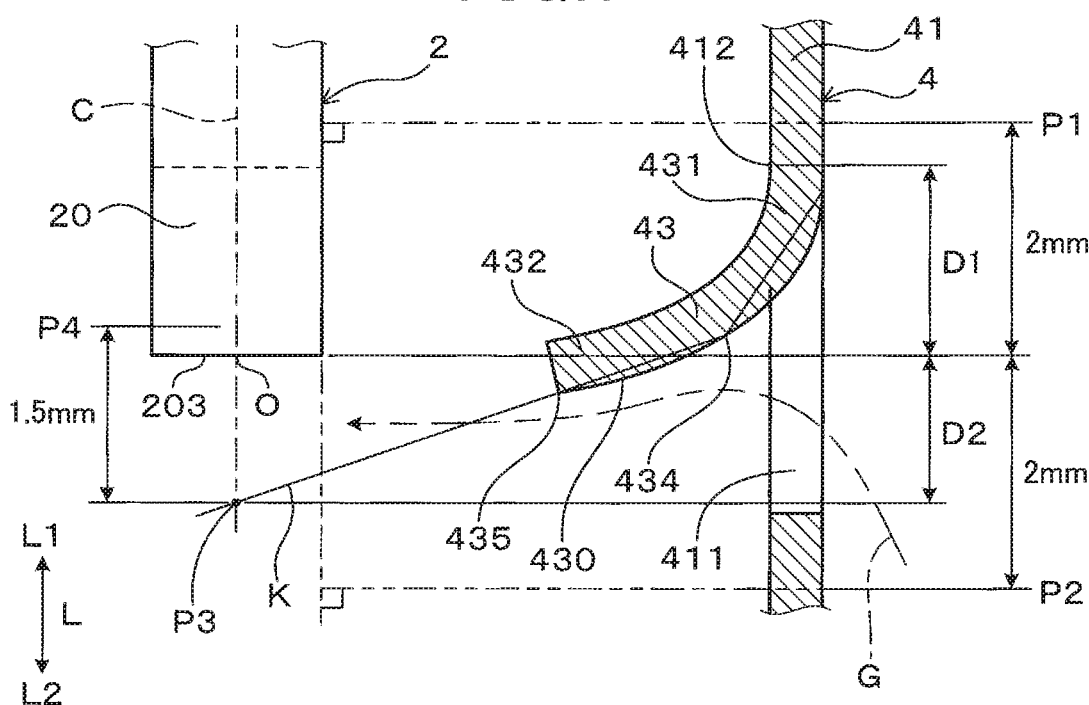

GAS SENSOR

CROSS-REFERENCE TO RELATED APPLICATIONS

This application is the U.S. national phase of International Application No. PCT/JP2017/014584 filed Apr. 7, 2017 which designated the U.S. and claims priority to Japanese Patent Application No. 2016-082922 filed on Apr. 18, 2016, the entire disclosure contents of each of which are incorporated herein by reference.

TECHNICAL FIELD

The present disclosure relates to a gas sensor including a sensor element which detects a specific gas component in measured gas.

BACKGROUND ART

Some gas sensors are used for detecting a specific gas component in measured gas which is exhaust gas flowing through an exhaust pipe of an engine. A sensor element which includes a solid electrolyte body and an electrode provided on the solid electrolyte body is held by a housing mounted on the exhaust pipe. A detection section which is provided at a tip end section of the sensor element in the exhaust pipe is covered and protected with an inner cover and an outer cover which covers the inner cover.

For example, Patent Literature 1 discloses a gas sensor which includes a sensor element and an inner cover and an outer cover which cover a detection section of the sensor element and each have an opening through which measured gas circulates. In the gas sensor, the opening in a side wall section of the inner cover is located on a tip end side of the sensor element in an axial direction relative to the opening in a side wall section of the outer cover. The opening in the side wall section of the inner cover faces the axial direction of the sensor element. The opening in the side wall section of the outer cover and the opening in the side wall section of the inner cover are formed such that positions of the openings do not overlap each other and that directions of the openings are different from each other.

CITATION LIST

Patent Literature

[PTL 1] JP 2009-25076 A

SUMMARY OF THE INVENTION

In recent years, due to tightening of regulations for specific gas components such as NOx, detection accuracy and responsiveness required for the sensor element tends to be high. In order to improve accuracy in detection of the specific gas component by the sensor element, the detection section of the sensor element preferably experiences a small change in temperature. To achieve the small change in temperature of the detection section, it is effective for the measured gas whose temperature sequentially changes to become less likely to directly collide with the detection section. Meanwhile, in order to improve responsiveness for detecting the specific gas component by the sensor element, it is preferable for the measured gas flowing into the inner cover to become more likely to reach the detection section of the sensor element. Accordingly, achievement of both the detection accuracy and the responsiveness requires the inner cover to have contradictory characteristics in which the measured gas is less likely to directly collide with the detection section and the measured gas is more likely to reach the detection section.

According to Patent Literature 1, the measured gas introduced from the opening in the inner cover into the inner cover is more likely to collide with a position on a base end side relative to the detection section for detecting a specific gas component provided at a tip end section of the sensor element. When the measured gas is more likely to collide with the sensor element, a change in temperature is more likely to occur in the detection section of the sensor element. Furthermore, according to Patent Literature 1, since the measured gas is more likely to collide with the position on the base end side relative to the detection section of the sensor element, it takes more time for the measured gas to reach the detection section of the sensor element. Accordingly, the gas sensor of Patent Literature 1 is incapable of achieving both improvement in accuracy in detection of the specific gas component and improvement in responsiveness for detecting the specific gas component.

The present disclosure has been made to provide a gas sensor capable of achieving both improvement in accuracy in detection of a specific gas component and improvement in responsiveness for detecting the specific gas component.

Solution to Problem

An aspect of the present disclosure is a gas sensor (1) including: a sensor element (2) which includes a detection section (20) for detecting a specific gas component in measured gas (G); a housing (3) into which the sensor element is inserted and held; an inner cover (4) which has a side wall section (41) and a bottom section (42) which cover the detection section which is mounted at a tip end of the housing and protrudes from the housing, the side wall section having a first inner circulation hole (411), the bottom section having a second inner circulation hole (421); and an outer cover (5) which has a side wall section (51) and a bottom section (52) which cover the inner cover, the side wall section having a first outer circulation hole (511), the bottom section having a second outer circulation hole (521), when in an axial direction (L) in which the sensor element is inserted into the housing, a tip end side (L2) is a side on which the inner cover is provided relative to the housing, and a base end side (L1) is a side opposite to the tip end side, a guide body (43) which protrudes towards an inner peripheral side being provided at a base end section (412) of the first inner circulation hole, the base end section of the first inner circulation hole being located between a base end position (P1) and a tip end position (P2), the base end position being a position obtained by projecting, on the inner cover in a direction perpendicular to the axial direction, a position which is 2 mm away from a tip end (203) of the sensor element in the axial direction towards the base end side, the tip end position being a position obtained by projecting, on the inner cover in the direction perpendicular to the axial direction, a position which is 2 mm away from the tip end of the sensor element in the axial direction towards the tip end side, the tip end of the sensor element in the axial direction being located at a position where an imaginary line (K) intersects with the tip end or a position which is on the base end side in the axial direction relative to the imaginary line, the imaginary line passing through a base end (434) and a tip end (435) on a surface (430) on the tip end side of the guide body.

Advantageous Effects of the Invention

The gas sensor defines two positional relationships, that is, a positional relationship between the tip end of the sensor element in the axial direction and the base end section of the first inner circulation hole in the side wall section of the inner cover and a positional relationship between the tip end of the sensor element in the axial direction and the guide body provided at the base end section of the first inner circulation hole.

As a first positional relationship, the base end section of the first inner circulation hole is located between the base end position and the tip end position. The base end position is the position obtained by projecting, on the inner cover in the direction perpendicular to the axial direction, the position which is 2 mm away from the tip end of the sensor element in the axial direction towards the base end side. The tip end position is the position obtained by projecting, on the inner cover in the direction perpendicular to the axial direction, the position which is 2 mm away from the tip end of the sensor element in the axial direction towards the tip end side. That is, in the axial direction of the sensor element, the base end section of the first inner circulation hole is located close to the tip end of the sensor element in the axial direction, and the measured gas flowing from the first inner circulation hole into the inner peripheral side of the inner cover is quickly introduced into the vicinity of the detection section mounted at the tip end section of the sensor element in the axial direction while being guided by the guide body. This enables the measured gas flowing from the first inner circulation hole into the inner peripheral side of the inner cover to reach the detection section of the sensor element in a short time. This makes it possible to improve responsiveness for detecting the specific gas component by the detection section of the sensor element.

As the second positional relationship, the tip end of the sensor element in the axial direction is located at the position where the imaginary line intersects with the tip end or the position which is on the base end side in the axial direction relative to the imaginary line. The imaginary line passes through the base end and the tip end on the surface on the tip end side of the guide body. This makes it possible to prevent the measured gas flowing into the inner peripheral side of the inner cover along the guide body from directly colliding with the detection section of the sensor element without colliding with the guide body. That is, even when the guide body is located close to the tip end of the sensor element in the axial direction due to the first positional relationship, by controlling a flow of the measured gas by the guide body, the measured gas becomes less likely to come into contact with the detection section of the sensor element. The measured gas is exhaust gas and the like exhausted from an internal combustion engine, and a temperature of the measured gas changes depending on a combustion state of the internal combustion engine. Accordingly, in the detection section of the sensor element, a change in temperature caused by a direct collision of the measured gas whose temperature changes becomes less likely to occur. This makes it possible to improve accuracy in detection of the specific gas component.

Thus, since the above gas sensor has the first positional relationship and the second positional relationship whose intended effects seem contradictory, it is possible to achieve both improvement in accuracy in detection of the specific gas component and improvement in responsiveness for detecting the specific gas component.

BRIEF DESCRIPTION OF THE DRAWINGS

The objects, features, advantages, and the like of the present disclosure will be clarified by the following detailed description with reference to the accompanying drawings. The drawings of the present disclosure are as follows.

FIG. 6 is a cross-sectional explanatory diagram illustrating positional relationships between the sensor element and each of another first inner circulation hole and another guide body, according to Embodiment 1.

FIG. 7 is a cross-sectional explanatory diagram illustrating positional relationships between the sensor element and each of another first inner circulation hole and another guide body, according to Embodiment 1.

DESCRIPTION OF THE EMBODIMENTS

A preferable embodiment of the above gas sensor will be described with reference to the drawings.

Embodiment 1

Figure 1:
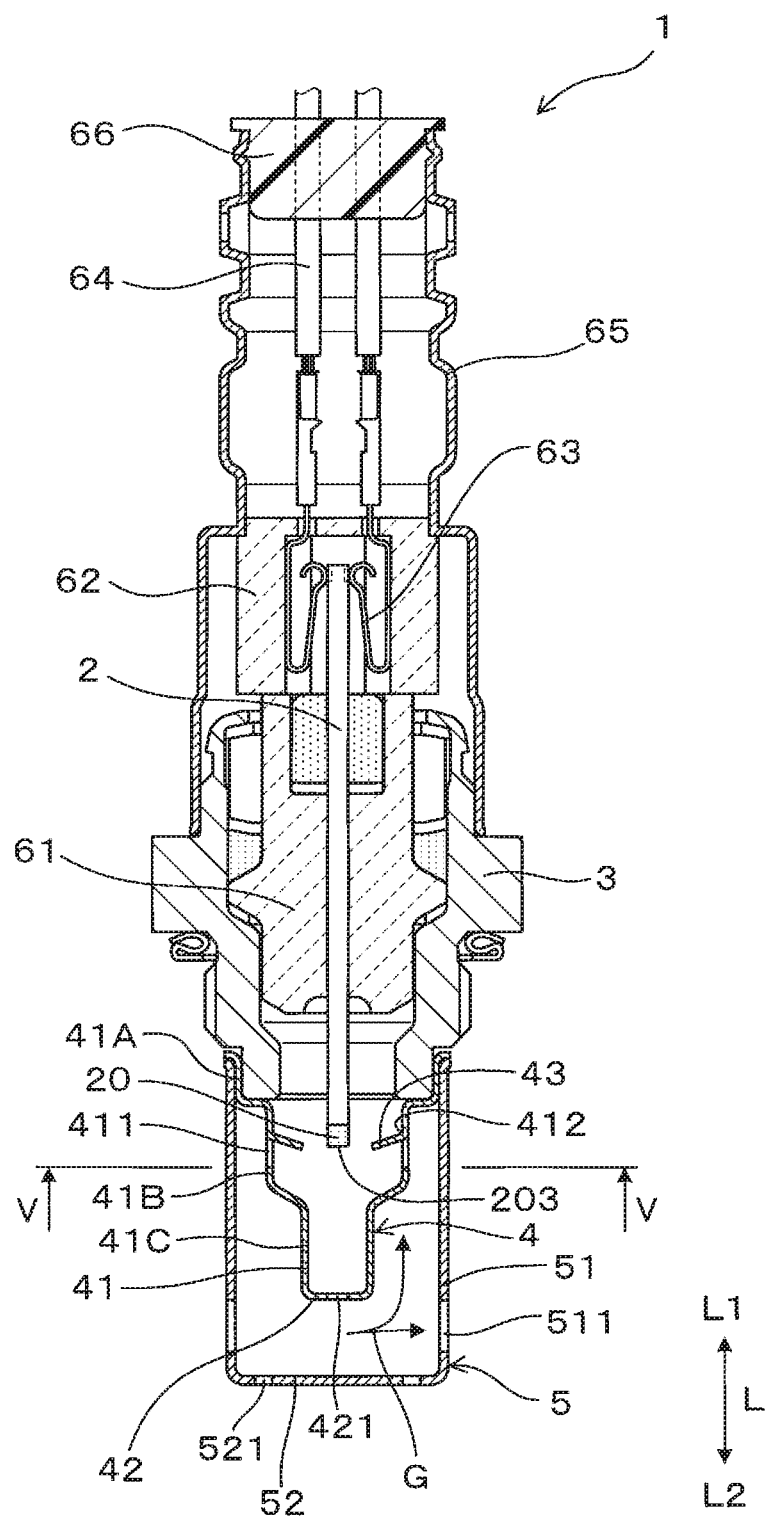
FIG. 1 is a cross-sectional explanatory diagram illustrating a gas sensor, according to Embodiment 1.

As illustrated in FIG. 1, a gas sensor 1 of the present embodiment includes a sensor element 2, a housing 3, an inner cover 4, and an outer cover 5. The sensor element 2 has a long shape, and at a tip end section of the sensor element 2 in an axial direction L, a detection section 20 for detecting a specific gas component in measured gas G is provided. The housing 3 holds the sensor element 2 which is inserted into the housing 3. The inner cover 4 is mounted at a tip end of the housing 3 and has a side wall section 41 and a bottom section 42 on a tip end side L2 which cover the detection section 20 protruding from the housing 3. The side wall section 41 of the inner cover 4 has a first inner circulation hole 411, and the bottom section 42 of the inner cover 4 has a second inner circulation hole 421. The outer cover 5 is mounted at the tip end of the housing 3 and has a side wall section 51 and a bottom section 52 on the tip end side L2 which cover the inner cover 4. The side wall section 51 of the outer cover 5 has a first outer circulation hole 511, and a bottom section 52 of the outer cover 5 has a second outer circulation hole 521.

In the gas sensor 1, the axial direction L is a direction in which the sensor element 2 is inserted into the housing 3, the tip end side L2 is a side on which the inner cover 4 is provided relative to the housing 3, and a base end side L1 is a side opposite to the tip end side L2.

Figure 2:
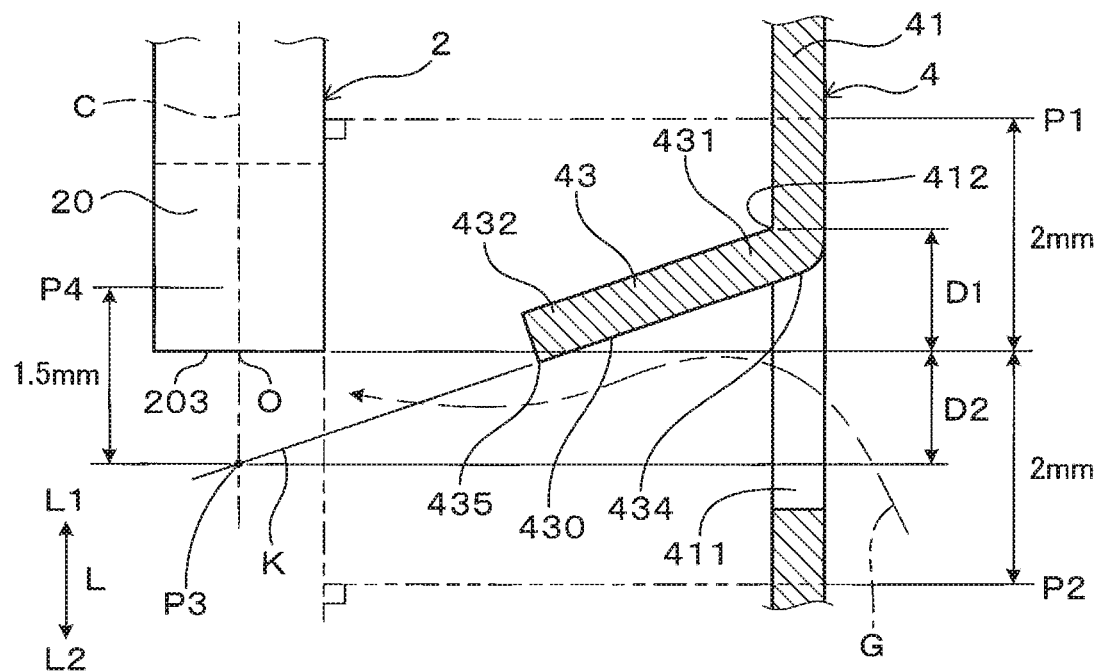
FIG. 2 is a cross-sectional explanatory diagram illustrating positional relationships between a sensor element and each of a first inner circulation hole and a guide body, according to Embodiment 1.
Figure 3:
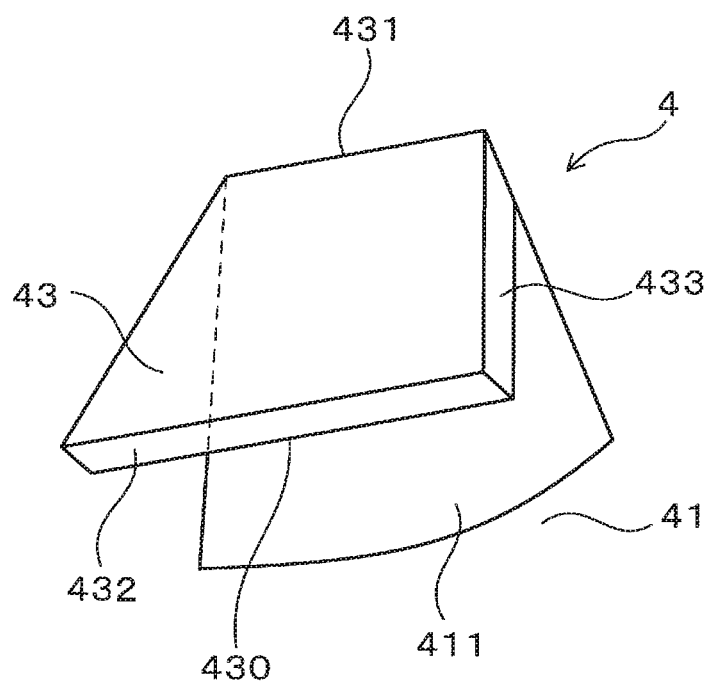
FIG. 3 is a perspective explanatory view illustrating the guide body, according to Embodiment 1.

As illustrated in FIGS. 2 and 3, a guide body 43 protruding towards an inner peripheral side is provided at a base end section 412 of the first inner circulation hole 411. The base end section 412 of the first inner circulation hole 411 is located between a base end position P1 and a tip end position P2. The base end position P1 is a position obtained by projecting, on the inner cover 4 in a direction perpendicular to the axial direction L, a position which is 2 mm away from the tip end 203 of the sensor element 2 in the axial direction L towards the base end side L1. The tip end position P2 is a position obtained by projecting, on the inner cover 4 in the direction perpendicular to the axial direction L, a position which is 2 mm away from the tip end 203 of the sensor element 2 in the axial direction L towards the tip end side L2. The tip end 203 of the sensor element 2 in the axial direction L is located on the base end side L1 in the axial direction L relative to an imaginary line K which passes through a base end 434 and a tip end 435 on a surface 430 on the tip end side L2 of the guide body 43.

In the gas sensor 1 of the present embodiment, the tip end 203 of the sensor element 2 in the axial direction L is located between an intersection position P3 and a position P4. The intersection position P3 is a position of an intersection point of the imaginary line K and a center line C which passes along the axial direction L through a center O of the tip end 203 of the sensor element 2 in the axial direction L. The position P4 is 1.5 mm away from the intersection position P3 towards the base end side L1 in the axial direction L.

In FIG. 2, a sign D1 indicates a distance in the axial direction L from the tip end 203 of the sensor element 2 in the axial direction L to the base end section 412 of the first inner circulation hole 411. Furthermore, a sign D2 indicates a distance in the axial direction L from the tip end 203 of the sensor element 2 in the axial direction L to the intersection position P3.

The base end section 412 of the first inner circulation hole 411 is located at a base end on the inner peripheral side of the guide body 43 provided in the inner cover 4. In a case where the guide body 43 is formed by a curved part of the inner cover 4, the base end section 412 indicates a starting point of the curve on the inner peripheral side of the guide body 43. The base end on the inner peripheral side or the starting point of the curve on the inner peripheral side indicates a position on an inner peripheral surface of the inner cover 4.

The gas sensor 1 of the present embodiment will be described in detail below. The gas sensor 1 is provided in an exhaust pipe of an internal combustion engine and is used for detecting a specific gas component in measured gas G which is exhaust gas flowing through the exhaust pipe. The specific gas component of the present embodiment is nitrogen oxide (NOx) such as nitric oxide and nitrogen dioxide. Reference gas A is air in which an oxygen concentration is constant.

The housing 3 of the gas sensor 1 is mounted on the exhaust pipe, and the inner cover 4 and the outer cover 5 of the gas sensor 1 are provided in the exhaust pipe.

Figure 4:
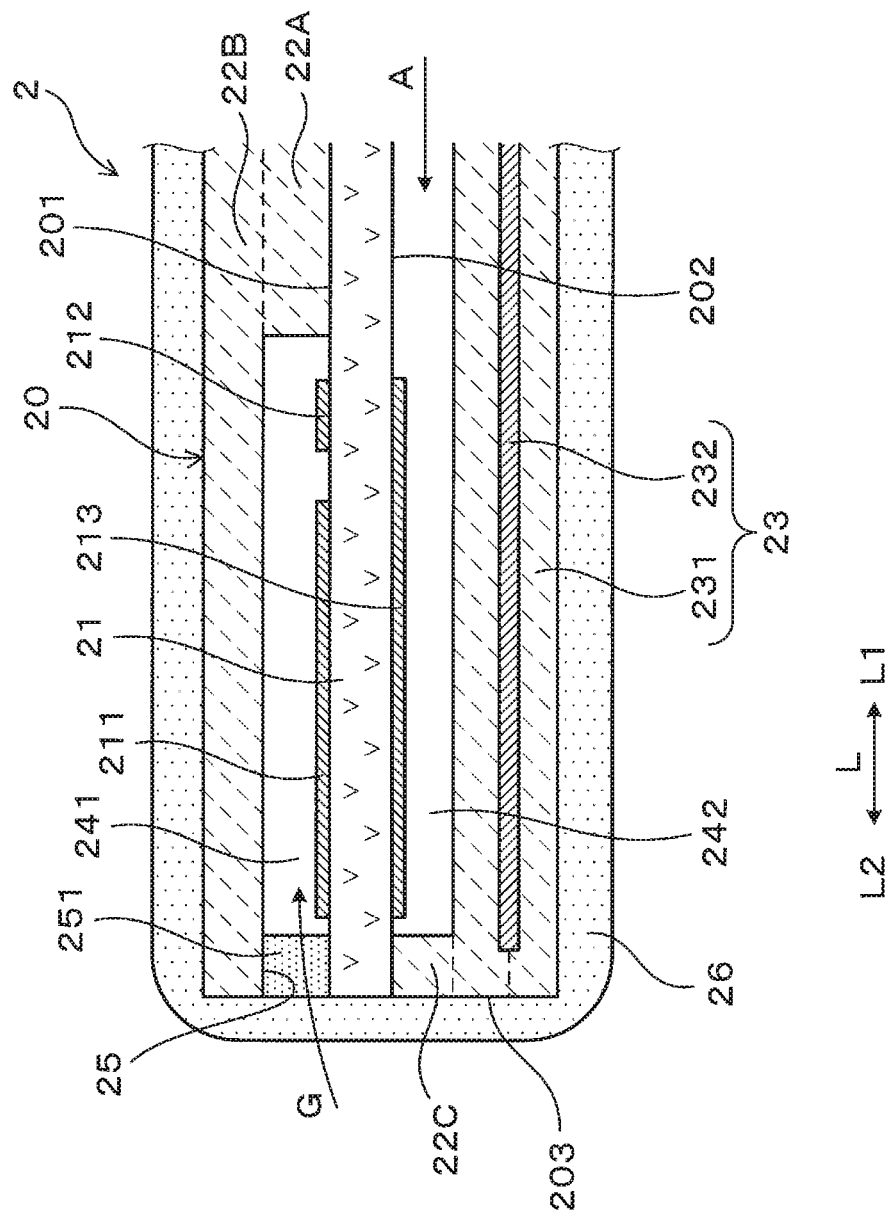
FIG. 4 is a cross-sectional explanatory diagram illustrating the sensor element, according to Embodiment 1.

As illustrated in FIG. 4, the sensor element 2 includes a solid electrolyte body 21 which has oxygen ion conductivity, a pump electrode 211 and a sensor electrode 212 which are provided on a first surface 201 of the solid electrolyte body 21, and a reference electrode 213 which is provided on a second surface 202 of the solid electrolyte body 21. A measured gas chamber 241 into which the measured gas G is introduced is adjacently formed on the first surface 201 of the solid electrolyte body 21. The pump electrode 211 and the sensor electrode 212 are located in the measured gas chamber 241. A reference gas chamber 242 into which the reference gas A is introduced is adjacently formed on the second surface 202 of the solid electrolyte body 21 which is opposite to the first surface 201. The reference electrode 213 is located in the reference gas chamber 242.

The sensor element 2 is formed such that ceramic insulating bodies 22A, 22B, and 22C are stacked on the solid electrolyte body 21 which has a plate shape. A heater 23 which has a plate shape and is used for heating the solid electrolyte body 21 is stacked in the sensor element 2.

The solid electrolyte body 21 is made of yttria stabilized zirconia. The measured gas chamber 241 is surrounded by the first insulating body 22A which is a plate-shaped spacer stacked on the first surface 201 of the solid electrolyte body 21 and the second insulating body 22B which has a plate shape. The reference gas chamber 242 is surrounded by the third insulating body 22C which is a plate-shaped spacer stacked on the second surface 202 of the solid electrolyte body 21 and the heater 23 which has a plate shape. The heater 23 includes a ceramic substrate 231 and a heating element 232 which is embedded inside the substrate 231 and generates heat by energization.

As illustrated in FIG. 4, the pump electrode 211 is used for adjusting an oxygen concentration in the measured gas chamber 241. Oxygen in the measured gas chamber 241 is removed by applying a voltage between the pump electrode 211 and the reference electrode 213. This enables the oxygen concentration in the measured gas G in the measured gas chamber 241 to be adjusted to a predetermined concentration or less.

The sensor electrode 212 is provided downstream of the pump electrode 211 in a flow direction of the measured gas G in the measured gas chamber 241. The sensor electrode 212 is used for detecting a specific gas component in the measured gas G in which the oxygen concentration has been adjusted by the pump electrode 211. A concentration of the specific gas component in the measured gas G is detected by detecting an electric current flowing between the sensor electrode 212 and the reference electrode 213.

With regard to the reference electrode 213 of the present embodiment, the single reference electrode 213 is provided in a region including a region which is opposed to the pump electrode 211 and the sensor electrode 212, in other words, a region where the pump electrode 211 and the sensor electrode 212 are projected in a thickness direction of the solid electrolyte body 21. Alternatively, the reference electrode 213 can be provided separately for each of the pump electrode 211 and the sensor electrode 212.

As illustrated in FIG. 4, the pump electrode 211, the sensor electrode 212, the reference electrode 213, and the measured gas chamber 241 are provided in the detection section 20 of the sensor element 2 on the tip end side L2 in the axial direction L. The detection section 20 of the sensor element 2 is provided in the exhaust pipe such that the detection section 20 is covered with the inner cover 4 and the outer cover 5. The reference gas chamber 242 extends from a portion which is opposed to the measured gas chamber 241 to a portion of the sensor element 2 on the base end side L1 in the axial direction L.

A tip end section of the first insulating body 22A has a gas inlet 25 for introducing the measured gas G into the measured gas chamber 241. At the gas inlet 25, a diffusion resistance body 251 for introducing the measured gas G into the measured gas chamber 241 with a predetermined diffusion resistance is provided. The diffusion resistance body 251 is composed of a ceramic porous body.

The detection section 20 of the sensor element 2 is covered with a protection layer 26 which allows the measured gas G to pass through but captures water and poisoning substances of the electrode. The protection layer 26 is composed of a ceramic porous body. The tip end 203 of the sensor element 2 in the axial direction L indicates the tip end 203 of the sensor element 2 excluding the protection layer 26.

The measured gas G coming into contact with the detection section 20 of the sensor element 2 passes through the protection layer 26 and the diffusion resistance body 251 and is introduced into the measured gas chamber 241. The oxygen concentration in the measured gas G in the measured gas chamber 241 is adjusted by applying a voltage between the pump electrode 211 and the reference electrode 213. The specific gas component in the measured gas G in which the oxygen concentration has been adjusted is decomposed in the sensor electrode 212 and is then detected by detecting an electric current flowing between the sensor electrode 212 and the reference electrode 213.

A temperature of the sensor element 2 is adjusted by controlling the amount of heating by the heater 23 so that a value of impedance between the pump electrode 211 and the reference electrode 213 via the solid electrolyte body 21 becomes a predetermined value. The impedance between the pump electrode 211 and the reference electrode 213 via the solid electrolyte body 21 has a correlation with a temperature of the pump electrode 211. By detecting the impedance between the pump electrode 211 and the reference electrode 213 via the solid electrolyte body 21, and controlling electric power supplied to the heating element 232 of the heater 23 so that a value of the impedance becomes a predetermined value, it is possible to control the temperature of the pump electrode 211 at a predetermined temperature. In the sensor element 2 of the present embodiment, the temperature of the pump electrode 211 is controlled to be approximately 800° C., and a temperature of the sensor electrode 212 is controlled to be approximately 600° C.

Alternatively, the temperature of the sensor element 2 is adjustable by controlling the amount of heating by the heater 23 so that a value of impedance between the sensor electrode 212 and the reference electrode 213 via the solid electrolyte body 21 becomes a predetermined value. The impedance between the sensor electrode 212 and the reference electrode 213 via the solid electrolyte body 21 has a correlation with the temperature of the sensor electrode 212. By detecting the impedance between the sensor electrode 212 and the reference electrode 213 via the solid electrolyte body 21, and controlling electric power supplied to the heating element 232 of the heater 23 so that a value of the impedance becomes a predetermined value, it is possible to control the temperature of the sensor electrode 212 at a predetermined temperature.

As illustrated in FIG. 1, the inner cover 4 has the side wall section 41 which has a cylindrical shape and the bottom section 42 which blocks the tip end side L2 of the side wall section 41. The side wall section 41 has an outer diameter which is changed in multiple stages. The side wall section 41 has a mounted side wall section 41A, a first side wall section 41B, and a second side wall section 41C. The mounted side wall section 41A is mounted on an outer periphery of the housing 3. The first side wall section 41B is provided in a position adjacent to the tip end side L2 of the mounted side wall section 41A and has a reduced diameter as compared with the mounted side wall section 41A. The second side wall section 41C is provided in a position adjacent to the tip end side L2 of the first side wall section 41B and has a reduced diameter as compared with the first side wall section 41B. The detection section 20 of the sensor element 2 is provided on an inner peripheral side of the first side wall section 41B. The first inner circulation hole 411 and the guide body 43 are provided in the first side wall section 41B. The first side wall section 41B of the present embodiment is formed in parallel to the axial direction L. Alternatively, the first side wall section 41B can be formed in a shape whose diameter is reduced towards the tip end side L2 in the axial direction L.

Figure 5:
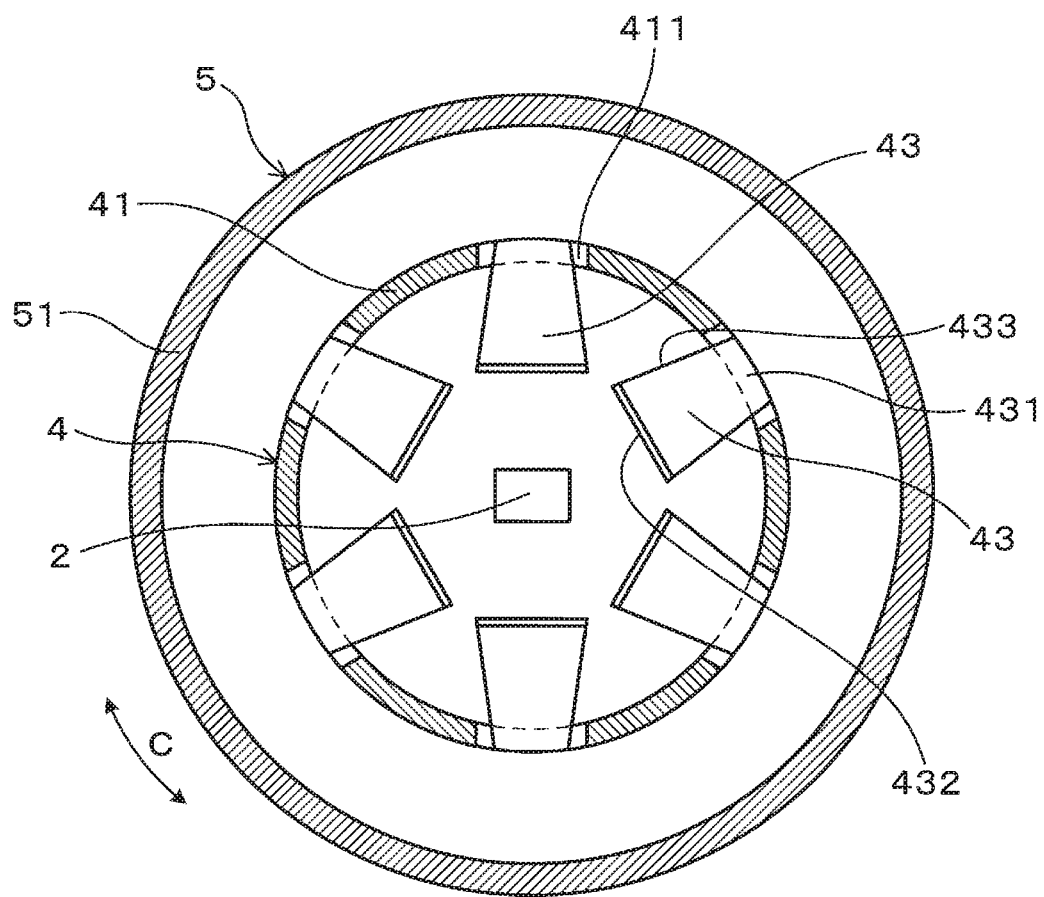
FIG. 5 is an explanatory diagram illustrating a cross section across a line V-V in FIG. 1, according to Embodiment 1.

As illustrated in FIG. 5, the first inner circulation hole 411 and the guide body 43 are provided at each of a plurality of positions in a circumferential direction C in the first side wall section 41B. The guide body 43 is provided at the base end section 412 of each of all the first inner circulation holes 411. In the guide body 43, a base end section 431 is connected to the inner cover 4, and a tip end section 432 and a pair of side sections 433 form a blade shape separated from the inner cover 4. The guide body 43 is formed by a portion which is curved from the inner cover 4. The guide body 43 is formed by a portion which is cut open from the inner cover 4 when the first inner circulation hole 411 is formed in the inner cover 4. The first inner circulation hole 411 is formed when the guide body 43 is formed in the inner cover 4.

As illustrated in FIG. 3, the guide body 43 has a flat and reverse tapered shape whose width between the pair of side sections 433 gradually increases from the base end side L1 towards the tip end side L2. A width of the tip end section 432 of the guide body 43 is greater than a width of the base end section 431 of the guide body 43. The guide body 43 can have a curved surface in at least one of a length direction from the base end to the tip end and a width direction in which the pair of side sections 433 are aligned.

As illustrated in FIG. 2, since the guide body 43 of the present embodiment has a flat shape, the base end 434 on the surface 430 on the tip end side L2 of the guide body 43 when the imaginary line K is drawn is a base end in a plane in which the tip end 435 on the surface 430 on the tip end side L2 of the guide body 43 is located. In a cross section of the gas sensor 1, the imaginary line K is drawn along the surface 430 of the guide body 43 having a flat shape.

A positional relationship between the guide body 43 and the tip end 203 of the sensor element 2 in the axial direction L can be as follows.

For example, as illustrated in FIG. 6, the tip end 203 of the sensor element 2 in the axial direction L can be located at a position where the tip end 203 intersects with the imaginary line K which passes through the base end 434 and the tip end 435 on the surface 430 on the tip end side L2 of the guide body 43. The tip end 203 indicates a tip end surface of the sensor element 2.

For example, as illustrated in FIG. 7, in a case where the guide body 43 is formed in a shape which is curved from the base end 434 towards the tip end 435, the base end 434 of the guide body 43 when the imaginary line K is drawn is located at a center position of a curve length in a tip end-base end direction on the surface 430 on the tip end side L2 of the guide body 43. The imaginary line K is a line which passes through the base end 434 as the center position and the tip end 435 which is located closest to the base end side L1 on the surface 430 on the tip end side L2 of the guide body 43.

The guide body 43 illustrated in each of FIGS. 2, 6, and 7 protrudes towards the inner peripheral side of the inner cover 4 and is tilted so that the tip end section 432 is located on the tip end side L2 in the axial direction L relative to the base end section 431.

Figure 8:
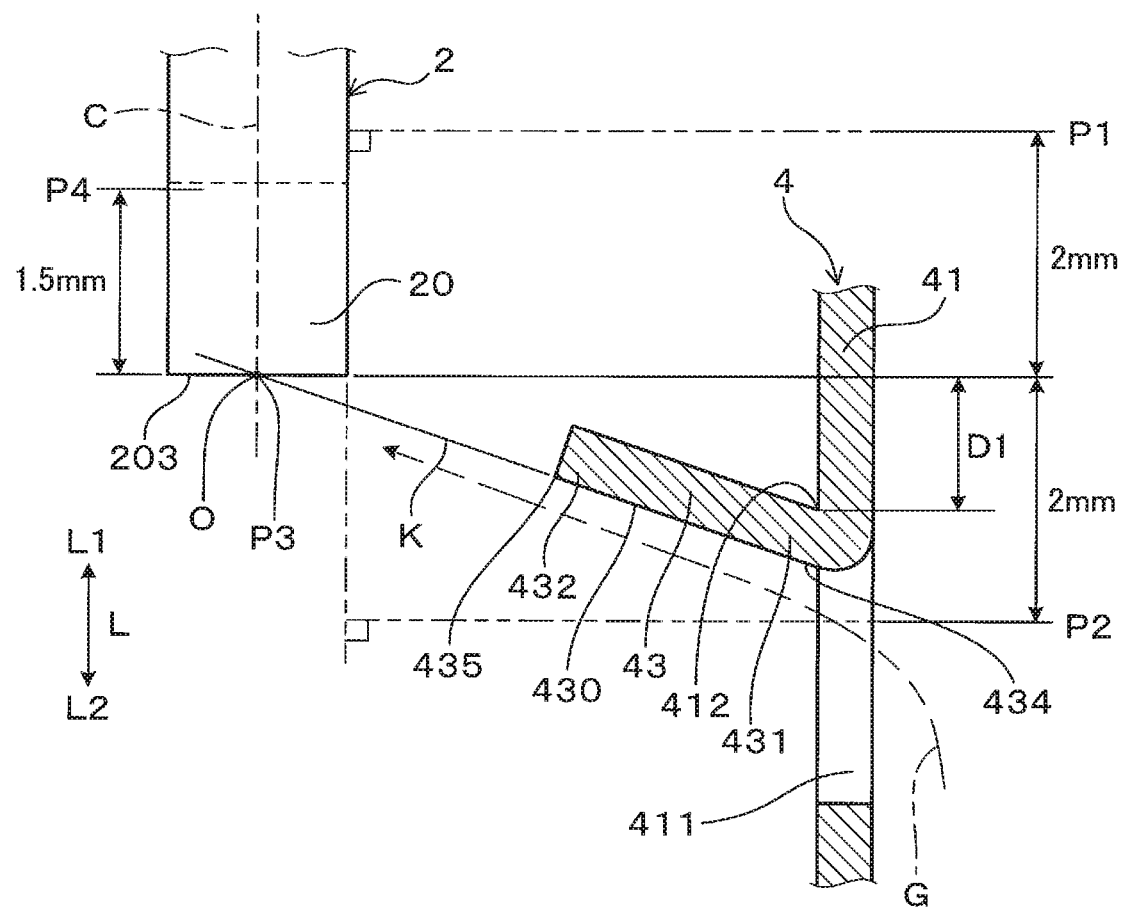
FIG. 8 is a cross-sectional explanatory diagram illustrating positional relationships between the sensor element and each of another first inner circulation hole and another guide body, according to Embodiment 1.

Alternatively, as illustrated in FIG. 8, the guide body 43 can protrude towards the inner peripheral side of the inner cover 4 and be tilted so that the tip end section 432 is located on the base end side L1 in the axial direction L relative to the base end section 431. Although not illustrated, the guide body 43 can protrude towards the inner peripheral side of the inner cover 4 so that the guide body 43 is perpendicular to the axial direction L.

As illustrated in FIG. 1, the first outer circulation hole 511 in the side wall section 51 of the outer cover 5 is formed at each of a plurality of positions in a circumferential direction in the side wall section 51. The first outer circulation hole 511 is located on the tip end side L2 in the axial direction L relative to the first inner circulation hole 411 in the first side wall section 41B of the inner cover 4. The first outer circulation hole 511 is formed in the vicinity of an end on the tip end side L2 of the side wall section 51 of the outer cover 5. The first outer circulation hole 511 can be formed at a position which is opposed to an outer peripheral side of the bottom section 42 of the inner cover 4 or a position which is on the tip end side L2 relative to the bottom section 42 of the inner cover 4.

In the gas sensor 1, the sensor element 2 is held via an insulator 61 and the like in the housing 3. On the base end side of the insulator 61, another insulator 62 which holds a contact terminal 63 is provided. A lead section of each of the electrodes 211, 212, and 213 and the heating element 232 is drawn out to a base end section of the sensor element 2 and is connected to the contact terminal 63. A lead wire 64 connected to the contact terminal 63 is held by a bush 66 in a cover 65 mounted on the base end side of the housing 3.

The gas sensor 1 of the present embodiment defines two positional relationships, that is, a positional relationship between the tip end 203 of the sensor element 2 in the axial direction L and the base end section 412 of the first inner circulation hole 411 in the side wall section 41 of the inner cover 4 and a positional relationship between the tip end 203 and the guide body 43 provided at the base end section 412.

As a first positional relationship, the base end section 412 of the first inner circulation hole 411 is located between the base end position P1 and the tip end position P2. The base end position P1 is the position obtained by projecting, on the inner cover 4 in the direction perpendicular to the axial direction L, the position which is 2 mm away from the tip end 203 of the sensor element 2 in the axial direction L towards the base end side L1. The tip end position P2 is the position obtained by projecting, on the inner cover 4 in the direction perpendicular to the axial direction L, the position which is 2 mm away from the tip end 203 of the sensor element 2 in the axial direction L towards the tip end side L2. That is, in the axial direction L of the sensor element 2, the base end section 412 of the first inner circulation hole 411 is located close to the tip end 203 of the sensor element 2 in the axial direction L.

In a case where the base end section 412 of the first inner circulation hole 411 is located on the base end side L1 relative to the base end position P1, the measured gas G flowing into the inner peripheral side of the inner cover 4 along the guide body 43 becomes more likely to collide with the detection section 20 of the sensor element 2, and thus a change in temperature of the detection section 20 becomes more likely to occur.

This leads to deterioration in accuracy in detection of the specific gas component by the detection section 20. Meanwhile, in a case where the base end section 412 of the first inner circulation hole 411 is located on the tip end side L2 relative to the tip end position P2, the measured gas G flowing into the inner peripheral side of the inner cover 4 along the guide body 43 becomes less likely to reach the detection section 20 of the sensor element 2. This leads to deterioration in responsiveness for detecting the specific gas component by the detection section 20.

When the gas sensor 1 detects a specific gas component in the measured gas G flowing through the exhaust pipe, the measured gas G flowing through the exhaust pipe flows from the first outer circulation hole 511 in the outer cover 5 into the outer cover 5, and then flows from the plurality of first inner circulation holes 411 into the inner cover 4. At this point, the measured gas G flowing from the first inner circulation holes 411 into the inner peripheral side of the inner cover 4 is introduced into the vicinity of the detection section 20 of the sensor element 2, while being guided by the guide body 43 provided at the base end section 412 of the first inner circulation hole 411 which is located close to the tip end 203 of the sensor element 2 as the first positional relationship. The tip end 203 of the sensor element 2 in the axial direction L is located within a range of 2 mm from the base end section 412 of the first inner circulation hole 411 in the axial direction L of the sensor element 2. This allows the measured gas G flowing into the inner peripheral side of the inner cover 4 along the guide body 43 to be quickly introduced into the vicinity of the detection section 20 of the sensor element 2. This enables the measured gas G flowing from the first inner circulation hole 411 into the inner peripheral side of the inner cover 4 to reach the detection section 20 of the sensor element 2 in a short time. This makes it possible to improve responsiveness for detecting the specific gas component by the detection section 20 of the sensor element 2.

As the second positional relationship, the tip end 203 of the sensor element 2 in the axial direction L is located between the intersection position P3 and the position P4. The intersection position P3 is the position of the intersection point of the imaginary line K and the center line C which passes along the axial direction L through the center O of the tip end 203 of the sensor element 2 in the axial direction L. The position P4 is 1.5 mm away from the intersection position P3 towards the base end side L1 in the axial direction L. This allows the measured gas G flowing into the inner peripheral side of the inner cover 4 along the guide body 43 to collide with the guide body 43 first and then collide with the detection section 20 of the sensor element 2. Thus, it is possible to prevent the measured gas G from directly colliding with the detection section 20 without colliding with the guide body 43.

By introducing the measured gas G which has collided with the guide body 43 into the detection section 20 of the sensor element 2, a flow of the measured gas G coming into contact with the detection section 20 becomes slow. The measured gas G is exhaust gas exhausted from the internal combustion engine, and a temperature of the measured gas G changes depending on a combustion state of the internal combustion engine. Accordingly, in the detection section 20 of the sensor element 2, a change in temperature caused by a direct collision of the measured gas G becomes less likely to occur. Due to the small amount of change in temperature of the detection section 20 of the sensor element 2, an activation state of the sensor electrode 212 becomes less likely to change or deterioration of the sensor electrode 212 becomes less likely to occur. This makes it possible to improve accuracy in detection of the specific gas component by the sensor electrode 212.

In a case where the tip end 203 of the sensor element 2 in the axial direction L is located on the tip end side L2 relative to the position where the imaginary line K intersects with the tip end 203, the measured gas G flowing into the inner peripheral side of the inner cover 4 along the guide body 43 becomes more likely to collide with the detection section 20 of the sensor element 2, and thus a change in temperature of the detection section 20 becomes more likely to occur. This leads to deterioration in accuracy in detection of the specific gas component by the detection section 20.

Meanwhile, in a case where the tip end 203 of the sensor element 2 in the axial direction L is located on the tip end side L2 relative to the position P4 which is 1.5 mm away from the intersection position P3 towards the base end side L1 in the axial direction L, the measured gas G flowing into the inner peripheral side of the inner cover 4 along the guide body 43 becomes less likely to reach the detection section 20 of the sensor element 2. This may lead to deterioration in responsiveness for detecting the specific gas component by the detection section 20.

The guide body 43 of the present embodiment has the aforementioned reverse tapered shape. Accordingly, the measured gas G which collides with the guide body 43 is less likely to flow from the pair of side sections 433 of the guide body 43 in the width direction and is more likely to flow towards the tip end section 432 of the guide body 43. Thus, the measured gas G is more likely to collide with the guide body 43. This allows the measured gas G to collide with the guide body 43 first and then collide with the detection section 20 of the sensor element 2. Accordingly, in the detection section 20 of the sensor element 2, a change in temperature caused by a direct collision of the measured gas G becomes less likely to occur.

Thus, since the gas sensor 1 of the present embodiment has the first positional relationship and the second positional relationship whose intended effects seem contradictory, it is possible to achieve both improvement in accuracy in detection of the specific gas component and improvement in responsiveness for detecting the specific gas component.

Embodiment 2

In the present embodiment, another aspect of the shape of the guide body 43 will be described.

Figure 9:
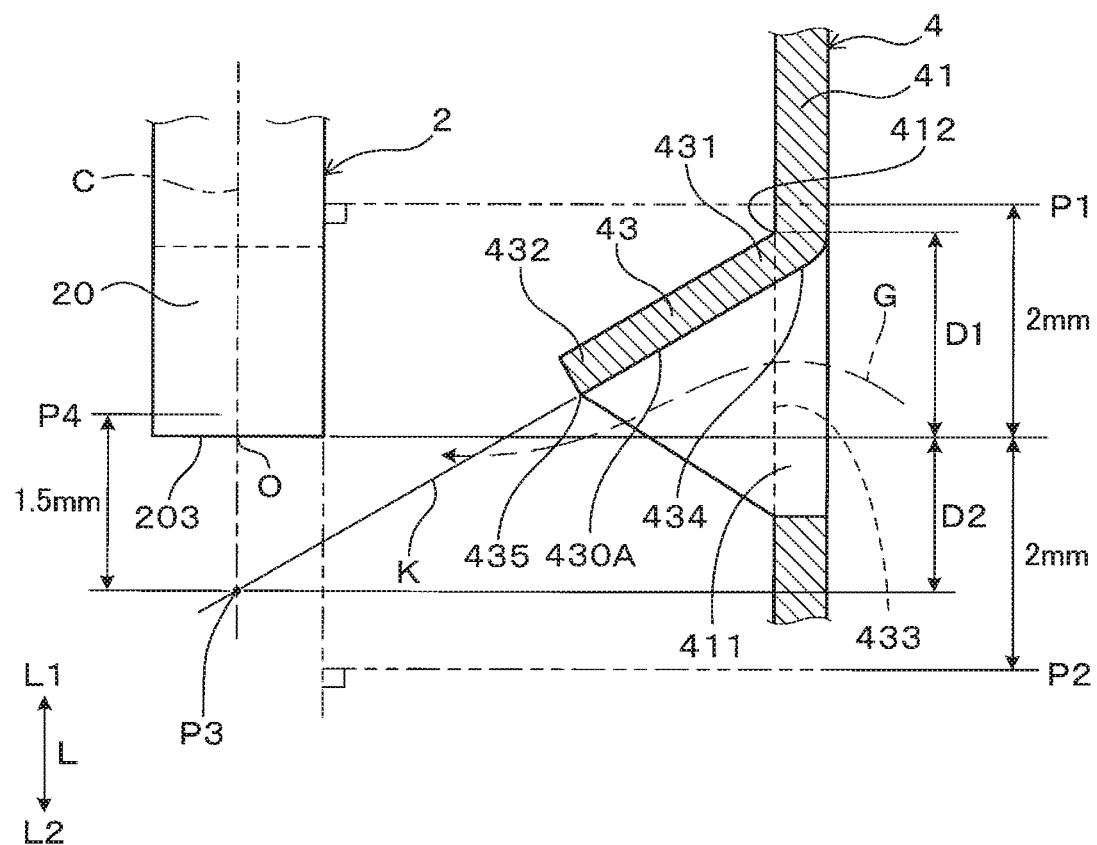
FIG. 9 is a cross-sectional explanatory diagram illustrating positional relationships between the sensor element and each of a first inner circulation hole and a guide body, according to Embodiment 2.
Figure 10:
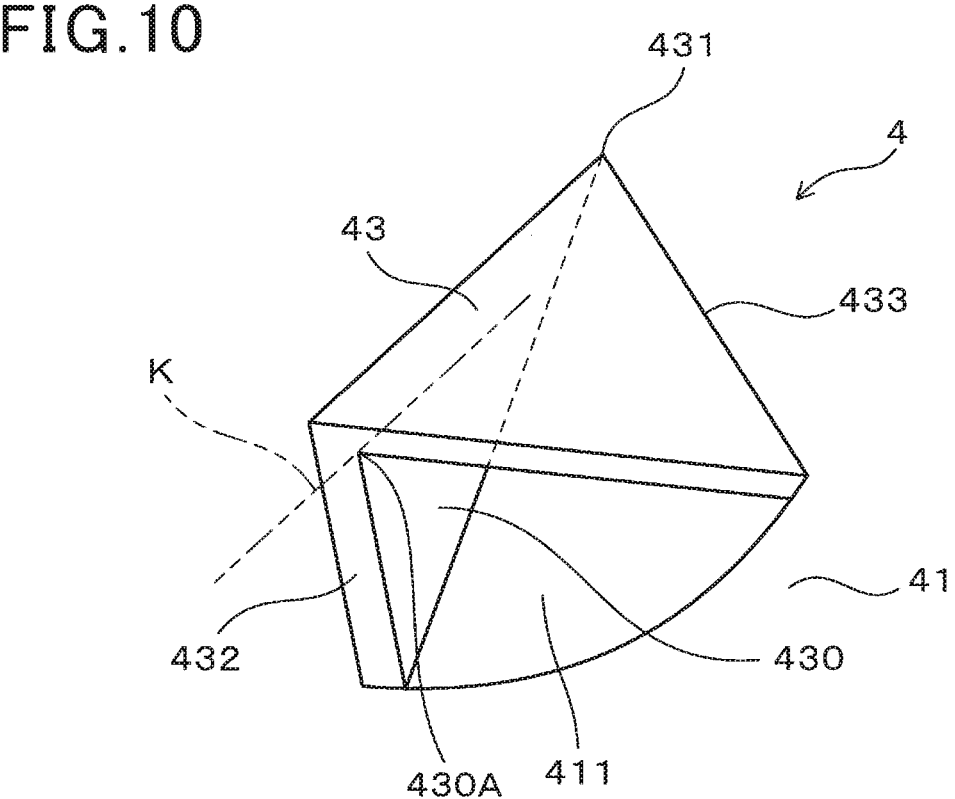
FIG. 10 is a perspective explanatory view illustrating the guide body, according to Embodiment 2.
Figure 11:
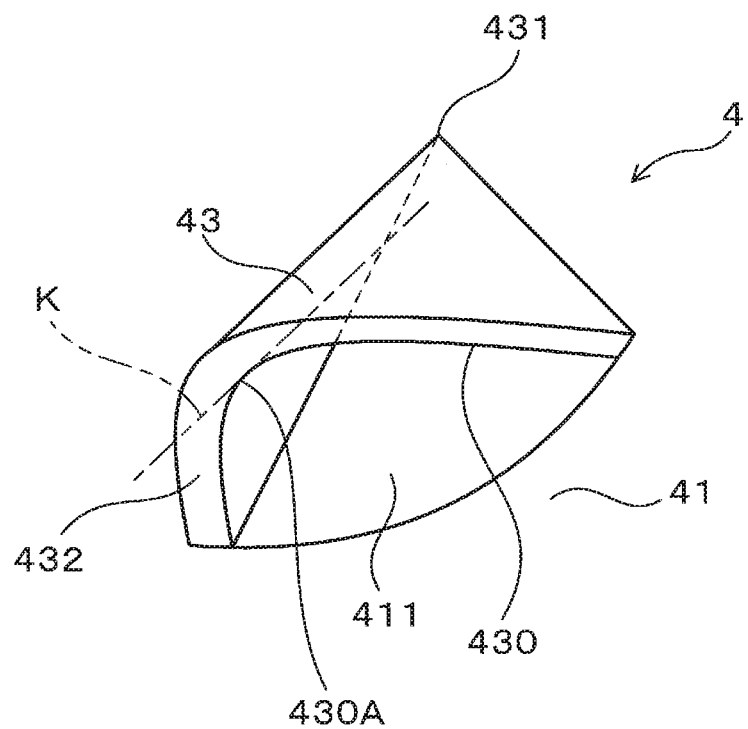
FIG. 11 is a perspective explanatory view illustrating another guide body, according to Embodiment 2.

As illustrated in FIGS. 9 to 11, in the guide body 43 of the present embodiment, the pair of side sections 433 which form a shape whose width increases from the base end section 431 towards the tip end section 432 are connected to the inner cover 4, and the tip end section 432 forms a shape separated from the inner cover 4. The guide body 43 is formed by a triangular portion which protrudes towards the inner peripheral side and in which a vertex as the base end section 431 is located on the base end side L1 on the inner peripheral surface of the inner cover 4.

As illustrated in FIG. 9, positional relationships between the sensor element 2 and each of the first inner circulation hole 411 and the guide body 43 are similar to those in FIGS. 2, 6 to 8, and the like of Embodiment 1.

As illustrated in FIG. 10, the guide body 43 can be formed such that two flat portions separated in the width direction are connected to each other. Alternatively, as illustrated in FIG. 11, the guide body 43 can have a curved surface which is curved towards the inner peripheral side in the width direction. In these cases, the imaginary line K is a line which passes through the base end 434 and the tip end 435 at a center position 430A in the circumferential direction C (see FIG. 5) on the surface 430 on the tip end side L2 of the guide body 43.

Although not illustrated, the guide body 43 can be formed by a quadrilateral portion including a trapezoid.

In the present embodiment, other configurations and components indicated by reference signs in the drawings are similar to those of Embodiment 1 and yield effects similar to those of Embodiment 1.

The technology according to the present disclosure is not limited only to the aforementioned embodiments, and other embodiments can be implemented without departing from the scope of the present invention.

(Check Test 1)

With regard to the gas sensor 1 (test item 1) which includes the guide body 43 described in Embodiment 1 and a gas sensor (comparison item) which does not include the guide body 43, Check Test 1 measured a range of changes in temperature of the sensor electrode 212 occurring after start of the engine. In the test item 1, the base end section 412 of the first inner circulation hole 411 was located 0.6 mm away from the tip end 203 of the sensor element 2 in the axial direction L towards the base end side L1, and the tip end 203 of the sensor element 2 in the axial direction L was located 1 mm away from the intersection position P3 towards the base end side L1 in the axial direction L.

The temperature of the sensor electrode 212 has a correlation with catalytic activity performance for the specific gas component of the sensor electrode 212. When the temperature of the sensor electrode 212 changes, accuracy in detection of the specific gas component also changes. Thus, it is preferable for the temperature of the sensor electrode 212 to be unchanged as much as possible.

Figure 12:
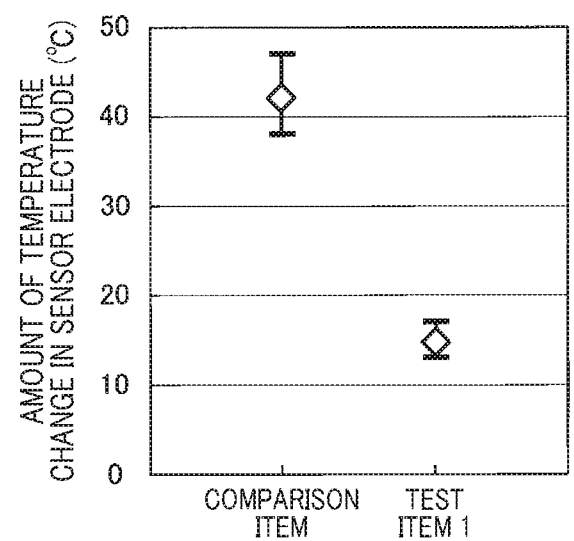
FIG. 12 is a graph showing a result of measurement of the amount of change in temperature of a sensor electrode of a comparison item and a test item 1, according to Check Test 1.

Specifically, each of the gas sensors was started by heating the sensor element 2 by the heater 23. After the temperature of the sensor electrode 212 reached equilibrium at a predetermined first temperature, the engine was started, and exhaust gas whose temperature was 200° C. and whose flow rate was 40 m/s was circulated through the exhaust pipe in which the gas sensor 1 was provided. Then, when the temperature of the sensor electrode 212 reached equilibrium at a predetermined second temperature, the amount of change (amount of change in temperature (° C.) of the sensor electrode 212) from the first temperature to the second temperature was measured. The measurement was repeated five times. FIG. 12 shows a result of the measurement. FIG. 12 shows a maximum value, a minimum value, and an average value of data.

As shown in FIG. 12, in the comparison item which does not include the guide body 43, the amount of change in temperature was approximately 40° C., and in the test item 1 which includes the guide body 43, the amount of change in temperature was approximately 15° C. In order to maintain high accuracy in detection of the specific gas component by the gas sensor 1, the amount of change in temperature of the sensor electrode 212 needs to be not more than 25° C. The result showed that the amount of change in temperature of the sensor electrode 212 of the test item 1 was maintained at not more than 25° C. which was a reference value, and thus the test item 1 achieves good accuracy in detection of the specific gas component.

(Check Test 2)

With regard to the gas sensor 1 which includes the guide body 43 described in Embodiment 1, Check Test 2 measured responsiveness of sensor output in a case (test item 1) where the tip end 203 of the sensor element 2 in the axial direction L was located 1 mm away from the intersection position P3 towards the base end side L1 in the axial direction L and in a case (test item 2) where the center O of the tip end 203 of the sensor element 2 in the axial direction L was located on the intersection position P3. In both of the test items 1 and 2, the base end section 412 of the first inner circulation hole 411 was located 0.6 mm away from the tip end 203 of the sensor element 2 in the axial direction L towards the base end side L1 in the axial direction L. In Check Test 2, configurations of the engine, the exhaust pipe, and the like for which the gas sensor 1 was used were similar to those of Check Test 1.

Figure 13:
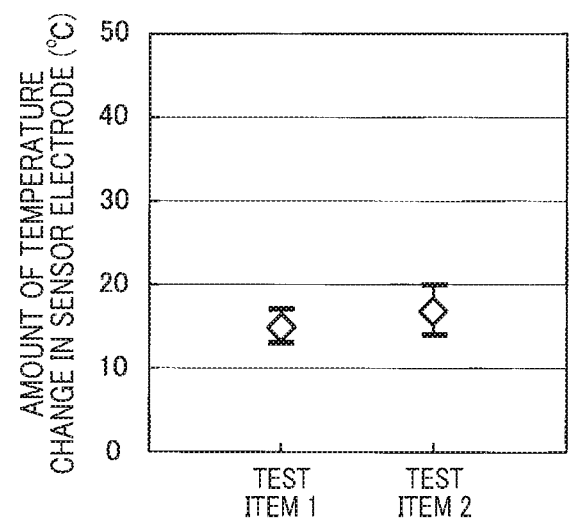
FIG. 13 is a graph showing a result of measurement of the amount of change in temperature of the sensor electrode of the test item 1 and a test item 2, according to Check Test 2.

FIG. 13 shows a result of measurement of the amount of change in temperature (° C.) of the sensor electrode 212 of the test item 2 performed as with Check Test 1. As shown in FIG. 13, the amount of change in temperature of the test item 2 was almost the same as the amount of change in temperature of the test item 1 shown in Check Test 1.

Figure 14:
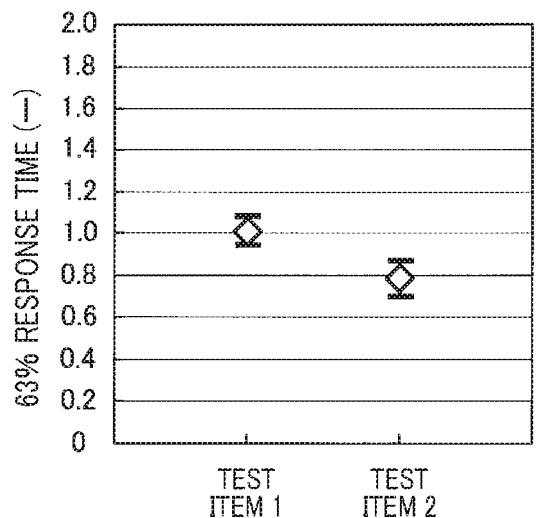
FIG. 14 is a graph showing a result of measurement of 63% response time of the test item 1 and the test item 2, according to Check Test 2.

Furthermore, Check Test 2 measured responsiveness of the sensor output as time (63% response time) required for the sensor output of 0% to reach 63% which was the maximum amount of change by step input, when an air-fuel ratio in the engine was changed stepwise from 30 to 40. FIG. 14 shows a result of the measurement. The 63% response time is indicated as a relative value of the 63% response time of the test item 2 to a value of the 63% response time of the test item 1, when the value of the 63% response time of the test item 1 is 1.

As shown in FIG. 14, it was found that the 63% response time of the test item 2 was shorter than the 63% response time of the test item 1. This showed that it is more preferable for the center O of the tip end 203 of the sensor element 2 in the axial direction L to be located on the intersection position P3 of the center line C and the imaginary line K.

(Check Test 3)

Figure 15:
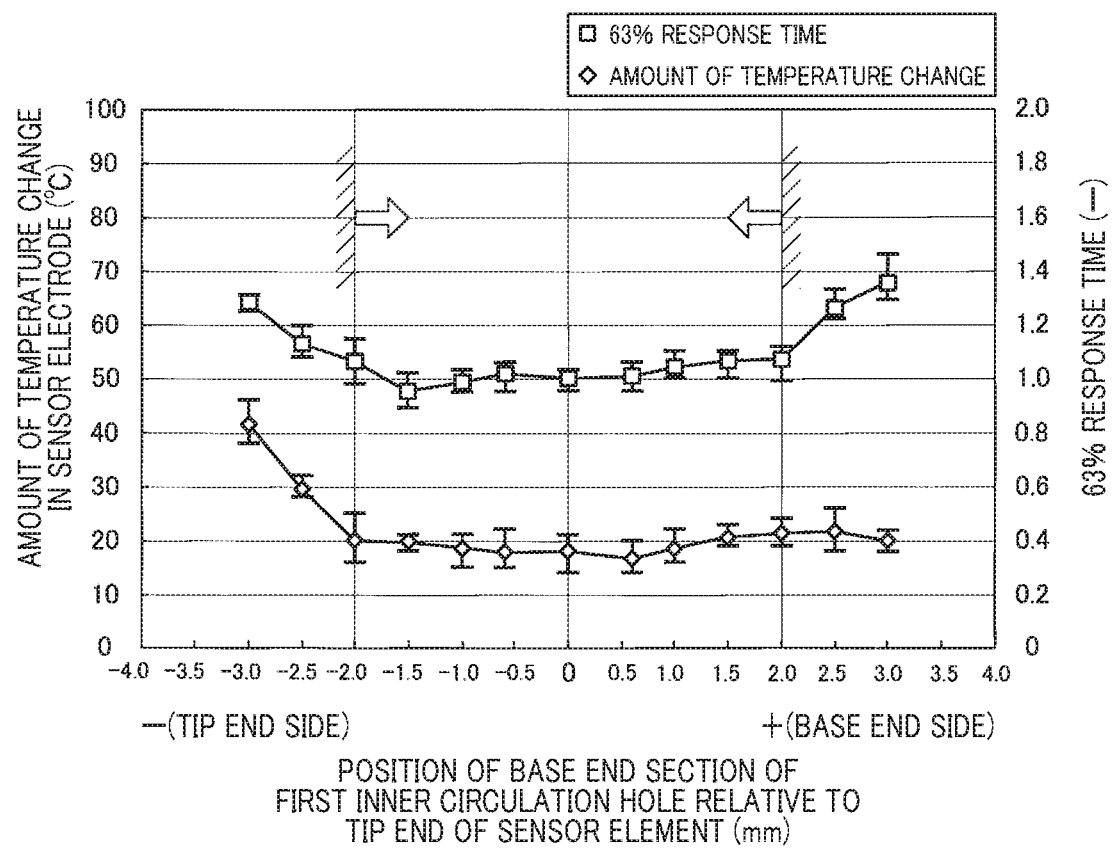
FIG. 15 is a graph showing a result of measurement of the amount of change in temperature of the sensor electrode and 63% response time, when a position of a base end section of the first inner circulation hole relative to a tip end of the sensor element is changed, according to Check Test 3.

Check Test 3 measured how much change occurred in the amount of change in temperature (° C.) of the sensor electrode 212 and the 63% response time (−) when the position of the base end section 412 of the first inner circulation hole 411 in the axial direction L relative to the tip end 203 of the sensor element 2 in the axial direction L was changed. FIG. 15 shows a result of the measurement. The center O of the tip end 203 of the sensor element 2 in the axial direction L was set on the intersection position P3 of the center line C and the imaginary line K.

As shown in FIG. 15, the position of the base end section 412 of the first inner circulation hole 411 in the axial direction L relative to the tip end 203 of the sensor element 2 in the axial direction L was changed from a position which was 3.0 mm away towards the tip end side L2 to a position which was 3.0 mm away towards the base end side L1. The position (mm) of the base end section 412 in the axial direction L relative to the tip end 203 is indicated by a negative value (−) when the position was shifted away towards the tip end side L2. Meanwhile, the position (mm) of the base end section 412 is indicated by a positive value (+) when the position was shifted away towards the base end side L1.

When the position (mm) of the base end section 412 in the axial direction L relative to the tip end 203 has a negative value, as illustrated in the shape of the guide body 43 in FIG. 8, the guide body 43 is curved with respect to the first side wall section 41B towards the base end side L1, and the tip end section 432 of the guide body 43 is located on the base end side L1 in the axial direction L relative to the base end section 431 of the guide body 43. When the position (mm) of the base end section 412 in the axial direction L relative to the tip end 203 has a positive value, as illustrated in the shape of the guide body 43 in FIG. 2, the guide body 43 is curved with respect to the first side wall section 41B towards the tip end side L2, and the tip end section 432 of the guide body 43 is located on the tip end side L2 in the axial direction L relative to the base end section 431 of the guide body 43. When a value of the position (mm) of the base end section 412 in the axial direction L relative to the tip end 203 is zero, the guide body 43 is curved in a direction almost perpendicular to the first side wall section 41B, and the tip end section 432 of the guide body 43 is located at almost the same position in the axial direction L as the base end section 431 of the guide body 43.

As shown in FIG. 15, when the position of the base end section 412 in the axial direction L relative to the tip end 203 was in a range of −2.0 to 2.0 mm, the amount of change in temperature was not more than 25° C. which was the reference value for maintaining high accuracy in detection of the specific gas component by the gas sensor 1. Meanwhile, as the position of the base end section 412 in the axial direction L relative to the tip end 203 became smaller than −2.0 mm, the amount of change in temperature increased. This is presumably because the measured gas G flowing towards the base end side L1 in the outer cover 5 and then flowing from the first inner circulation hole 411 into the inner cover 4 flows towards the base end side L1 along the surface 430 on the tip end side L2 of the guide body 43, and thus the measured gas G becomes more likely to collide with a position in the vicinity of the tip end 203 of the sensor element 2.

The 63% response time (−) is indicated as the relative amount of change in 63% response time to the 63% response time of 1, when the 63% response time is 1 in a case where the position of the base end section 412 of the first inner circulation hole 411 relative to the tip end 203 of the sensor element 2 in the axial direction L is 0 mm. Specifically, as the 63% response time becomes greater than 1, the 63% response time becomes longer.

When the position of the base end section 412 in the axial direction L relative to the tip end 203 was in the range of −2.0 to 2.0 mm, the 63% response time was not more than 1.1. The 63% response time is preferably not more than 1.1, which indicates that the 63% response is within a range of 10% delay from reference response time. In this case, responsiveness for detecting the specific gas component by the gas sensor 1 is maintained high.

Meanwhile, as the position of the base end section 412 relative to the tip end 203 became smaller than −2.0 mm or greater than 2.0 mm, the 63% response time increased. This is presumably because when the base end section 412 of the first inner circulation hole 411 becomes farther away from the tip end 203 of the sensor element 2 in the axial direction L, the measured gas G flowing from the first inner circulation hole 411 into the inner cover 4 becomes less likely to reach the detection section 20 of the sensor element 2.

Thus, when the position of the base end section 412 of the first inner circulation hole 411 in the axial direction L is within the range of −2.0 to 2.0 mm relative to the tip end 203 of the sensor element 2 in the axial direction L, it is possible to achieve both improvement in accuracy in detection of the specific gas component, which is indicated by the amount of change in temperature (° C.) of the sensor electrode 212 and improvement in responsiveness for detecting the specific gas component, which is indicated by the 63% response time.

The invention claimed is:

1. A gas sensor comprising:
    a sensor element which includes a detection section for detecting a specific gas component in measured gas;
    a housing into which the sensor element is inserted and held;
    an inner cover which has a side wall section and a bottom section which cover the detection section which is mounted at a tip end of the housing and protrudes from the housing, the side wall section having a first inner circulation hole, the bottom section having a second inner circulation hole; and
    an outer cover which has a side wall section and a bottom section which cover the inner cover, the side wall section having a first outer circulation hole, the bottom section having a second outer circulation hole, wherein
    when in an axial direction in which the sensor element is inserted into the housing, a tip end side is a side on which the inner cover is provided relative to the housing and a base end side is a side opposite to the tip end side,
    a guide body which protrudes towards an inner peripheral side being provided at a base end section of the first inner circulation hole,
    the base end section of the first inner circulation hole being located between a base end position and a tip end position, the base end position being a position obtained by projecting, on the inner cover in a direction perpendicular to the axial direction, a position which is 2 mm away from a tip end of the sensor element in the axial direction towards the base end side, the tip end position being a position obtained by projecting, on the inner cover in the direction perpendicular to the axial direction, a position which is 2 mm away from the tip end of the sensor element in the axial direction towards the tip end side,
    the tip end of the sensor element in the axial direction being located at a position where an imaginary line intersects with the tip end or a position which is on the base end side in the axial direction relative to the imaginary line, the imaginary line passing through a base end and a tip end on a surface on the tip end side of the guide body,
    the tip end of the sensor element in the axial direction is located between an intersection position and a position, the intersection position being a position of an intersection point of the imaginary line and a center line which passes along the axial direction through a center of the tip end of the sensor element in the axial direction, the position being a position which is 1.5 mm away from the intersection position towards the base end side in the axial direction,
    the guide body has a reverse tapered shape whose width between a pair of side sections gradually increases from the base end side towards the tip end side, and
    a width of the tip end section of the guide body is greater than a width of the base end section of the guide body.

2. The gas sensor according to claim 1, wherein
in the guide body, a base end section of the guide body is connected to the inner cover, and a tip end section and a pair of side sections form a first shape separated from the inner cover.

3. The gas sensor according to claim 2, wherein
a width of the tip end section of the guide body is greater than a width of the base end section of the guide body.

4. The gas sensor according to claim 1, wherein
in the guide body, a pair of side sections which form a second shape whose width increases from a base end section of the guide body towards a tip end section are connected to the inner cover, and the tip end section of the guide body forms a third shape separated from the inner cover.

5. The gas sensor according to claim 1, wherein
the guide body has a flat surface or a curved surface.

6. The gas sensor according to claim 1, wherein:
the sensor element includes:
    a solid electrolyte body which has oxygen ion conductivity;
    a measured gas chamber which is in contact with a first surface of the solid electrolyte body and into which measured gas is introduced;
    a reference gas chamber which is in contact with a second surface of the solid electrolyte body and into which reference gas is introduced, the second surface being opposite to the first surface;
    a pump electrode which is provided on the first surface and is configured to adjust an oxygen concentration in the measured gas chamber;
    a sensor electrode which is provided on the first surface and is configured to detect a specific gas component in the measured gas in which the oxygen concentration has been adjusted by the pump electrode; and
    a reference electrode which is provided on the second surface, and
    a heater for heating the solid electrolyte body is stacked in the sensor element.

7. The gas sensor according to claim 6, wherein
a temperature of the sensor element is adjusted by controlling an amount of heating by the heater so that a value of impedance between the pump electrode and the reference electrode via the solid electrolyte body becomes a predetermined value.

8. The gas sensor according to claim 6, wherein
a temperature of the sensor element is adjusted by controlling an amount of heating by the heater so that a value of impedance between the sensor electrode and the reference electrode via the solid electrolyte body becomes a predetermined value.

9. The gas sensor according to claim 1, wherein:
the guide body has a shape which is curved from the base end of r guide body towards the tip end of the guide body;
the base end of the guide body, when the imaginary line is drawn, is located at a center position of a curve length in a tip end-base end direction on the surface on the tip end side of the guide body; and the imaginary line passes through the base end of the guide body as the center position and the tip end of the surface which is located closest to the base end side on the surface on the tip end side of the guide body.

10. The gas sensor according to claim 1, wherein:

the guide body includes two flat portions which are connected to each other.

11. The gas sensor according to claim 1, wherein:

the guide body has a curved surface which is curved towards an inner peripheral side in a width direction such that the imaginary line passes through the base end of the guide body and the tip end of the guide body at a center position in a circumferential direction on the surface on the tip end side of the guide body.

12. A gas sensor comprising:

a sensor element which includes a detection section for detecting a specific gas component in measured gas;

a housing into which the sensor element is inserted and held;

an inner cover which has a side wall section and a bottom section which cover the detection section which is mounted at a tip end of the housing and protrudes from the housing, the side wall section having a first inner circulation hole, the bottom section having a second inner circulation hole; and an outer cover which has a side wall section and a bottom section which cover the inner cover, the side wall section having a first outer circulation hole, the bottom section having a second outer circulation hole, wherein when in an axial direction in which the sensor element is inserted into the housing, a tip end side is a side on which the inner cover is provided relative to the housing and a base end side is a side opposite to the tip end side, a guide body which protrudes towards an inner peripheral side being provided at a base end section of the first inner circulation hole, the base end section of the first inner circulation hole being located between a base end position and a tip end position, the base end position being a position obtained by projecting, on the inner cover in a direction perpendicular to the axial direction, a position which is 2 mm away from a tip end of the sensor element in the axial direction towards the base end side, the tip end position being a position obtained by projecting, on the inner cover in the direction perpendicular to the axial direction, a position which is 2 mm away from the tip end of the sensor element in the axial direction towards the tip end side, the tip end of the sensor element in the axial direction being located at a position where an imaginary line intersects with the tip end or a position which is on the base end side in the axial direction relative to the imaginary line, the imaginary line passing through a base end and a tip end on a surface on the tip end side of the guide body, the tip end of the sensor element in the axial direction is located between an intersection position and a position, the intersection position being a position of an intersection point of the imaginary line and a center line which passes along the axial direction through a center of the tip end of the sensor element in the axial direction, the position being a position which is 1.5 mm away from the intersection position towards the base end side in the axial direction, the guide body has a shape which is curved from the base end of the guide body towards the tip end of the guide body, the base end of the guide body, when the imaginary line is drawn, is located at a center position of a curve length in a tip end-base end direction on the surface on the tip end side of the guide body, and the imaginary line passes through the base end of the guide body as the center position and the tip end of the surface which is located closest to the base end side on the surface on the tip end side of the guide body.

13. A gas sensor comprising:

a sensor element which includes a detection section for detecting a specific gas component in measured gas;

a housing into which the sensor element is inserted and held;

an inner cover which has a side wall section and a bottom section which cover the detection section which is mounted at a tip end of the housing and protrudes from the housing, the side wall section having a first inner circulation hole, the bottom section having a second inner circulation hole; and an outer cover which has a side wall section and a bottom section which cover the inner cover, the side wall section having a first outer circulation hole, the bottom section having a second outer circulation hole, wherein when in an axial direction in which the sensor element is inserted into the housing, a tip end side is a side on which the inner cover is provided relative to the housing and a base end side is a side opposite to the tip end side, a guide body which protrudes towards an inner peripheral side being provided at a base end section of the first inner circulation hole, the base end section of the first inner circulation hole being located between a base end position and a tip end position, the base end position being a position obtained by projecting, on the inner cover in a direction perpendicular to the axial direction, a position which is 2 mm away from a tip end of the sensor element in the axial direction towards the base end side, the tip end position being a position obtained by projecting, on the inner cover in the direction perpendicular to the axial direction, a position which is 2 mm away from the tip end of the sensor element in the axial direction towards the tip end side, the tip end of the sensor element in the axial direction being located at a position where an imaginary line intersects with the tip end or a position which is on the base end side in the axial direction relative to the imaginary line, the imaginary line passing through a base end and a tip end on a surface on the tip end side of the guide body, the tip end of the sensor element in the axial direction is located between an intersection position and a position, the intersection position being a position of an intersection point of the imaginary line and a center line which passes along the axial direction through a center of the tip end of the sensor element in the axial direction, the position being a position which is 1.5 mm away from the intersection position towards the base end side in the axial direction, and the guide body includes two flat portions which are connected to each other.

14. A gas sensor comprising:

a sensor element which includes a detection section for detecting a specific gas component in measured gas;

a housing into which the sensor element is inserted and held;

an inner cover which has a side wall section and a bottom section which cover the detection section which is mounted at a tip end of the housing and protrudes from the housing, the side wall section having a first inner circulation hole, the bottom section having a second inner circulation hole; and an outer cover which has a side wall section and a bottom section which cover the inner cover, the side wall section having a first outer circulation hole, the bottom section having a second outer circulation hole, wherein when in an axial direction in which the sensor element is inserted into the housing, a tip end side is a side on which the inner cover is provided relative to the housing and a base end side is a side opposite to the tip end side, a guide body which protrudes towards an inner peripheral side being provided at a base end section of the first inner circulation hole, the base end section of the first inner circulation hole being located between a base end position and a tip end position, the base end position being a position obtained by projecting, on the inner cover in a direction perpendicular to the axial direction, a position which is 2 mm away from a tip end of the sensor element in the axial direction towards the base end side, the tip end position being a position obtained by projecting, on the inner cover in the direction perpendicular to the axial direction, a position which is 2 mm away from the tip end of the sensor element in the axial direction towards the tip end side, the tip end of the sensor element in the axial direction being located at a position where an imaginary line intersects with the tip end or a position which is on the base end side in the axial direction relative to the imaginary line, the imaginary line passing through a base end and a tip end on a surface on the tip end side of the guide body, the tip end of the sensor element in the axial direction is located between an intersection position and a position, the intersection position being a position of an intersection point of the imaginary line and a center line which passes along the axial direction through a center of the tip end of the sensor element in the axial direction, the position being a position which is 1.5 mm away from the intersection position towards the base end side in the axial direction, and the guide body has a curved surface which is curved towards an inner peripheral side in a width direction such that the imaginary line passes through the base end of the guide body and the tip end of the guide body at a center position in a circumferential direction on the surface on the tip end side of the guide body.

* * * * *